Patented Feb. 22, 1944

2,342,481

UNITED STATES PATENT OFFICE 2,342,481

HEAVY METAL COMPOUND OF THIURAM-DISULPHIDES AND ITS MANUFACTURE

Paul Müller, Neu-Allschwil, near Basel, Switzerland, assignor to the firm J. R. Geigy A. G., Basel, Switzerland No Drawing. Application June 12, 1940, Serial No. 340,202. In Switzerland July 3, 1939

5 Claims. (Cl. 260—431)

It is known to use for mordanting cereal-seed thiuram-sulphides of the general formula:

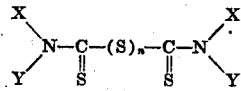

wherein X means alkyl or aralkyl, Y means alkyl, aralkyl or aryl and $n$ means 1 to 3, see British Patent 406,996.

Furthermore it is known to use tetraalkyl-thiuram-sulphides in the fruit-culture as fungicides, for example for combatting Fusicladium and so on. According to the German Patent 642,532 the mentioned compounds are considered as not to be sufficiently effective as seed mordants.

It has now surprisingly been found that thiuram-disulphides, symmetrical as well as unsymmetrical ones, of the general formula:

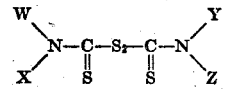

wherein W, X, Y, Z may be hydrogen or any aliphatic, araliphatic or aromatic radicals, can be combined in a neutral to acid medium with heavy metal salts without desulphuration of the organic component. The nature of these heavy metal compounds of thiuram-disulphides is not quite cleared up, but the same are probably complex compounds, in some cases perhaps also metal-organic compounds. In the obtained metal compounds the present acid radicals can also be subsequently exchanged against other ones or still other reactions can be undertaken therewith.

With respect to the alkylthiuram-sulphides the aforesaid heavy metal compounds show a manifold stronger effect as fungicides and seed mordanting agents.

The following table gives the considerably enhanced effect of the new metal compounds against Tilletia:

|  | 30% | 20% | 15% | 10% | 5% | 3% | 2% |
|---|---|---|---|---|---|---|---|
| Tetramethylthiuram-disulphide | — | +++ | +++ | +++ | +++ | +++ | +++ |
| Mercuric chloride compound | — | — | — | — | — |  |  |
| Cupric chloride compound | — | — | — | — | — | + | ++ |
| Copper-sulphate compound | — | — | — | — | — | + | + |
| Cupro-chloride compound | — | — | — | — | — | — | — |
| Ferric chloride compound | — | — | — | — | — | + | + |
| Zinc chloride compound | — | — |  |  |  |  |  |
| Antimonium trichloride compound | — | — | — | — | +++ |  |  |
| Lead acetate compound | — | — | — | + | + |  |  |

Definition: — signifies no growth, + signifies feeble growth, ++ signifies middle growth, +++ signifies strong growth.

The new compounds have also a likewise good effect against other seed fungi such as for example Fusarium etc. Furthermore it must be mentioned that the lead, antimonium and arsenic compounds are suitable as food poisons. The copper compounds are advantageously used as fungicides in the fruit- and wine-culture. Moreover certain compounds, especially the silver compounds may come into consideration as disinfectants and as pharmaceutical intermediate products. The compounds can be intermixed with the usual diluents and diluting agents and furthermore suitable wetting and emulsifying agents may be added.

The following examples illustrate the invention, the parts being by weight.

Example 1

40 parts of zinc chloride (anhydrous) are dissolved in 200 parts of alcohol and 25 parts of tetramethylthiuram-disulphide are added thereto. The whole is heated until all matter is dissolved. The dark solution is filtered and poured into a lot of water. The zinc compound separates out as grey-white powder.

Example 2

12 parts of tetramethylthiuram-disulphide are dissolved in 150 parts of benzene and the solution is cooled down to room-temperature, whereupon a cold solution of 10 parts of crystallized cupric chloride in 50 parts of alcohol is added thereto. The resulting precipitate is sucked off, washed with ether and dried at low temperature. It is a brown powder which for the greatest part is soluble in cold water with green color. If the green solution is heated, it becomes decomposed under separation of brown flakes. The solid compound also decomposes easily itself on heating under delivering of heat and yielding of fume.

Example 3

12 parts of tetramethylthiuram-disulphide are dissolved in 150 parts of benzene and the solution somewhat cooled is poured into a solution of 20 parts of cupric chloride (cryst.) in 100 parts of alcohol. The resulting precipitate is sucked off, then well washed with alcohol and benzene and dried at 30–40° C. in vacuo. It results in an olive-green powder, which is partly soluble in water with green color. This compound is, contrarily to the aforesaid compound, stable on dry heating. Copper content: 29.8%. Both copper compounds are excellent seed mordanting agents which are particularly efficacious to Tilletia as well as to Fusarium and the other seed fungi. By cold stirring for several hours the Cl-containing copper compound with a solution of sodium acetate the reactive chlorine can be replaced by acetate. The reaction product is brown and does no more react acid, but nevertheless the fungicide effect has been fully preserved.

Example 4

12 parts of tetramethylthiuram-disulphide are suspended in a solution of 30 parts of copper sulphate in 200 parts of water and stirred at room temperature during 18–24 hours. After exhausting by suction and drying there results a dark-brown, almost black powder. Analogous compounds are obtained by treating tetramethyl-thiuram-disulphide with aqueous solutions of other copper salts, for instance cupric chloride. The copper content of the compound obtained with copper-sulphate amounts to 11.7%.

Instead of tetramethylthiuram-disulphide there may be used with the same result tetra-ethylthiuram-disulphide or diethyldicyclohexyl-thiuram-disulphide.

Example 5

12 parts of tetramethylthiuram-disulphide are suspended in a cooled solution of 15 parts of cuprous chloride in 100 parts of water and 50 parts of concentrated hydrochloric acid and the whole is stirred during 4–6 hours at 30–35° C. There results a grass-green powder with a copper content of 22.8%, which is scarcely soluble in water. The preparation gradually decomposes itself on the air, especially in presence of light, under becoming deepened in color.

Example 6

12 parts of tetramethylthiuram-disulphide are dissolved in 150 parts of benzene and added to a solution of 26 parts of mercuric chloride in 100 parts of alcohol. A yellowish-white precipitate is formed, which is sucked off and dried at low temperature. Mercury content: 42.7%.

Example 7

12 parts of tetramethylthiuram-disulphide are dissolved in 150 parts of benzene and added to a solution of 20 parts of ferric chloride (anhydrous) in 100 parts of alcohol. There results a clear dark solution. By addition of ether the iron compound is precipitated out. It forms, after exhausting by suction and drying, a black powder with an iron-content of 15.9% and is soluble in benzene or alcohol-benzene, but insoluble in water.

Example 8

12 parts of tetramethylthiuram-disulphide are added to a hot solution of 40 parts of lead acetate in 500 parts of alcohol and some drops of acetic acid. The whole is boiled for a short time, thus producing the dissolution of the tetramethyl-thiuram-disulphide and, after a short time, causing the precipitation of the lead compound as a white crystallized powder. It is sucked off, washed with alcohol and dried. Lead content: 18.1%.

Example 9

40 parts of antimonium trichloride are dissolved in 150 parts of alcohol. A solution of 12 parts of tetramethylthiuram-disulphide in 150 parts of benzene is rapidly added thereto. There results a yellowish-white precipitate which is sucked off, washed with alcohol and dried in the desiccator. Antimonium content: 28.7%.

Example 10

To a solution of 25 parts of arsenic trichloride in 100 parts of benzene a solution of 12 parts of tetramethylthiuram-disulphide in 150 parts of benzene is rapidly added. There is formed a yellowish-white precipitate which is sucked off and dried in the desiccator. The fresh dried precipitate dissolves in water with strong congo acid reaction. The aqueous solution can be neutralized without precipitation. By mixing the acid solution with the solution of a lead salt a white precipitate is formed. The arsenic percentage of the substance precipitated by arsenic trichloride amounts to 25% calculated on $As_2O_3$.

Example 11

A solution of 16 parts of dimorpholylthiuram-disulphide in 150 parts of benzene is added to a solution of 20 parts of (crystallized) cupric chloride in 100 parts of alcohol. The resulting dark precipitate is sucked off, then well washed with alcohol and ether and dried. There results an olive-green powder with a copper content of 22.5%.

Example 12

A solution of 8 parts of dipiperidylthiuram-disulphide in 50 parts of benzene is intermixed with a solution of 10 parts of silver nitrate in 150 parts of alcohol. There results a yellowish precipitate which is sucked off and washed out with alcohol and ether. Silver content: about 43%.

Example 13

A mixture of 60 parts of a solution of dimethyl-amine (20%) with 100 parts of water, 40 parts of caustic soda lye (of 30% strength) and 19 parts of carbon disulphide is stirred until the latter is dissolved, whereupon the whole is intermixed with a mixture of 20 parts of piperidine, 200 parts of water, 40 parts of caustic soda lye (of 30% strength) and 19 parts of carbon disulphide.

This mixture is converted, by pouring it rapidly into the solution of an oxidizing agent, for instance 60 parts of ammonium persulphate in 1500 to 2000 parts of water, into the unsymmetrical thiuram of the formula

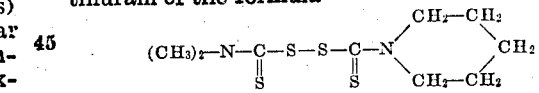

which separates out as thickly liquid oil. 13 parts of this compound are hot dissolved in 100 parts of alcohol and rapidly added to a solution of 20 parts of cupric chloride in 100 parts of alcohol. The black metal compound separated out is sucked off, washed with alcohol and dried at low temperature in vacuo.

Example 14

12 parts of potassium hydroxide are dissolved in 130 parts of alcohol and 50 parts of 4:4'-di-chloro-2-aminodiphenylether are added thereto, the latter dissolving easily. After the addition of 16 parts of carbon disulphide the mixture is further stirred until the latter is dissolved and until, after cooling down, fine needles separate out. The whole is sucked off, well washed with ether and then the obtained dithiocarbaminate of the following composition

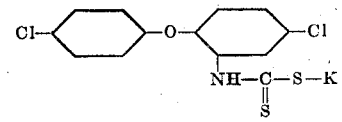

is dried.

6 parts of potassium hydroxide are dissolved in 200 parts of alcohol, 37 parts of the above di-thiocarbaminate and then 31 parts of an alcoholic solution of dimethylamine of 14.7% strength and 8 parts of carbon disulphide are added thereto. The mixture is heated to 30–40° C. until the dithiocarbaminate becomes just dissolved, whereupon this solution is rapidly added to an aqueous solution of 30 parts of ammonium persulphate in 1200 parts of water. The unsymmetrical thiuram of the following formula precipitates out:

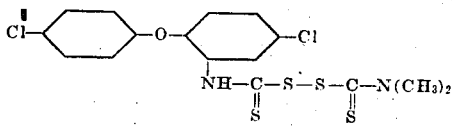

11 parts of this thiuram are dissolved in 50 parts of alcohol and this solution is caused, while well stirring, to flow into a solution of 15 parts of cupric chloride in 75 parts of alcohol. One obtains a dark, very fine precipitate which is sucked off and washed out with alcohol and ether. After drying the copper compound is obtained in form of an olive-green powder.

What I claim is:

1. A process for the manufacture of a metal compound of a thiuram disulphide, which comprises admixing in a neutral to acid medium and thereby effecting a reaction between a thiuram disulphide and a soluble metal salt containing a metal selected from the group consisting of mercury, copper, and lead and also containing an anion which is stable to sulphur under reaction conditions, said medium containing a solvent for the said metal salt.

2. The double compound of a thiuram disulphide and a metal salt containing a metal selected from the group consisting of mercury, copper, and lead and also containing an anion which does not react with sulphur in a neutral to acid medium containing a solvent for said salt and in the presence of a thiuram disulphide, said compound having marked fungicidal and seed mordanting activity.

3. The double compound of tetramethylthiuram-disulphide and cupric chloride which has marked fungicidal and seed mordanting activity.

4. The double compound of tetramethylthiuram-disulphide and cuprous chloride which has marked fungicidal and seed mordanting activity.

5. The double compound of tetramethylthiuram-disulphide and mercuric chloride which has marked fungicidal and seed mordanting activity.

PAUL MÜLLER.